US012706108B2

(12) United States Patent
Venkatraman et al.

(10) Patent No.: US 12,706,108 B2
(45) Date of Patent: Aug. 11, 2026

(54) SIGNAL TRANSFORMATION BASED ON UNIQUE KEY-BASED NETWORK GUIDANCE AND CONDITIONING

(71) Applicant: DTS, Inc., Calabasas, CA (US)

(72) Inventors: Atti Venkatraman, Calabasas, CA (US); Zoran Fejzo, Calabasas, CA (US); Antonius Kalker, Calabasas, CA (US)

(73) Assignee: DTS Inc., Calabasas, CA (US)

( * ) Notice: Subject to any disclaimer, the term of this patent is extended or adjusted under 35 U.S.C. 154(b) by 210 days.

(21) Appl. No.: 18/104,071

(22) Filed: Jan. 31, 2023

(65) Prior Publication Data

US 2023/0197091 A1 Jun. 22, 2023

Related U.S. Application Data

(63) Continuation of application No. PCT/US2020/044522, filed on Jul. 31, 2020.

(51) Int. Cl.
*G10L 19/08* (2013.01)
*G10L 25/30* (2013.01)

(52) U.S. Cl.
CPC .............. *G10L 19/08* (2013.01); *G10L 25/30* (2013.01)

(58) Field of Classification Search
CPC ................................ G10L 19/08; G10L 25/30
See application file for complete search history.

(56) References Cited

U.S. PATENT DOCUMENTS 4,667,340 A * 5/1987 Arjmand ................. G10L 19/08 704/207
10,127,918 B1 * 11/2018 Kamath Koteshwara .................. G11B 27/038
2019/0341067 A1 11/2019 Rajendran et al.
2020/0221242 A1 * 7/2020 Kim ........................ G10L 25/30
2022/0013132 A1 * 1/2022 Engel ..................... G06N 3/045
2022/0051075 A1 * 2/2022 Zhu ........................ G06V 10/82
2022/0215848 A1 * 7/2022 Xiao ....................... G10L 19/12
2023/0120140 A1 * 4/2023 Morsy ...................... H04R 3/00 84/625

(Continued)

FOREIGN PATENT DOCUMENTS

CN 110136690 A 8/2019

OTHER PUBLICATIONS

International Search Report and Written Opinion in counterpart International Application No. PCT/US2020/044522, mailed Apr. 28, 2021, 15 pages.

(Continued)

*Primary Examiner* — Bhavesh M Mehta
*Assistant Examiner* — Edward Tracy, Jr.
(74) *Attorney, Agent, or Firm* — Lerner David LLP

(57) ABSTRACT

A method comprises receiving input audio and target audio having a target audio characteristic. The method includes estimating key parameters that represent the target audio characteristic based on one or more of the target audio and the input audio. The method further comprises configuring a neural network, trained to be configured by the key parameters, with the key parameters to cause the neural network to perform a signal transformation of the input audio, to produce output audio having an output audio characteristic corresponding to and that matches the target audio characteristic.

13 Claims, 9 Drawing Sheets

(56) References Cited

U.S. PATENT DOCUMENTS

| | | | | |
|---|---|---|---|---|
| 2023/0162754 A1* | 5/2023 | Yeh | G10L 25/84 | |
| | | | 704/202 | |
| 2023/0368804 A1* | 11/2023 | Kleijn | G10L 25/30 | |

OTHER PUBLICATIONS

Liqiang Zhang, "Learning Singing from Speech," ARXIV.Org, Cornell University Library, Dec. 20, 2019, 5 pages.
Ju-Chieh Chou, et al., "Multi-Target Voice Conversion without Parallel Data by Adversarially Learning Disentangled Audio Representations," ARXIV.Org, Cornell University Library, Apr. 9, 2018 5 pages.
Aaron van den Oord, et al., "WaveNet: A Generative Model for Raw Audio," ARXIV.Org, 4609.03499, https://arxiv.org/abs/1609.03499, Sep. 19, 2016, 15 pages.
David Ha., et al., "HyperNetworks," ARXIV.Org, 1609.09106, https://arxiv.org/abs/1609.09106, Dec. 1, 2016, 29 pages.
Ethan Perez, et al., "FILM: Visual Reasoning with a General Conditioning Layer," ARXIV.Org, 1709.07871, https://arxiv.org/abs/1709.07871, Dec. 18, 2017, 13 pages.
Ashish Vaswani, et al., "Attention Is All You Need," ARXIV.Org, 1706.03762, https://arxiv.org/abs/1706.03762, Dec. 6, 2017, 15 pages.
Xuan Ji, et al., "Speaker-Aware Target Speaker Enhancement by Jointly Learning with Speaker Embedding Extraction," IEEE Xplor, ICASSP 2020—2020 IEEE International Conference on Acoustics, Speech and Signal Processing (ICASSP), May 4, 2020.
Konstantin Schmidt, et al., "Blind Bandwidth Extension of Speech based on LPCNet," 28th European Signal Processing Conference (EUSIPCO), Jan. 18, 2020, 5 pages.
W. Bastiaan Kleijn, et al., "Wavenet Based Low Rate Speech Coding," 2018 IEEE International Conference on Acoustics, Speech and Signal Processing (ICASSP), Apr. 15, 2018, 5 pages.
Milos Cernak, et al., "Composition of Deep and Spiking Neural Networks of Very Low Bit rate Speech Coding," ARXIV.Org, Cornell University Library, Apr. 15, 2016, 10 pages.
Lin Jiang, et al., "Low Bitrates Audio Bandwidth Extension Using a Deep Auto-Encoder," ICIAP: International Conference on Image Analysis and Processing, 17th International Conference, Nov. 22, 2015, 10 pages.
Qingbo Huang, et al., "A Parametric Spatial Audio Coding method based on Convolutional Neural Networks," Audio Engineering Society, Convention Paper 10126, Oct. 17-20, 2018, 7 pages.

* cited by examiner

SIGNAL TRANSFORMATION BASED ON UNIQUE KEY-BASED NETWORK GUIDANCE AND CONDITIONING

PRIORITY CLAIM

This application is a continuation of International Application No. PCT/US2020/044522, filed on Jul. 31, 2020, the entirety of which is incorporated herein by reference.

TECHNICAL FIELD

The present disclosure relates to performing key-guided signal transformations.

BACKGROUND

Static machine learning (ML) networks can model and learn a fixed signal transformation function. When there are multiple different signal transformations or in case of a continuously time-varying transformation, the static ML models tend to learn, for example, a suboptimal stochastically averaged transformation.

DESCRIPTION OF EXAMPLE EMBODIMENTS

Example Embodiments

Embodiments presented herein provide key-based machine learning (ML) neural network conditioning to model time-varying signal transformations. The embodiments are directed to configuring a "key space" and signal transformation mapping for different applications based on the key space. Applications broadly range from audio signal synthesis and speech quality improvements to cryptography and authentication.

The embodiments implement at least the following high-level features:

a. Identifying a suitable key space associated with a signal transformation for an input signal, generating key parameters that uniquely represent or characterize the signal transformation and that are fixed over a period, such as a frame of the input signal, and configuring a machine learning neural network to synthesize an output signal of transformed input signal using the key parameters corresponding to the frame of the input signal. The key space associated with the signal transformation defines or contains a finite number of key parameters and a range of values for the key parameters suitable for configuring the neural network to perform the associated signal transformation.

b. During training of the neural network, adjusting or selecting a cost minimization criterion based at least on a characteristic of the frame of the input signal, a training frame, and the unique key corresponding to the frame, such that the neural network learns to be configured by the unique key to implement the signal transformation.

Figure 1:
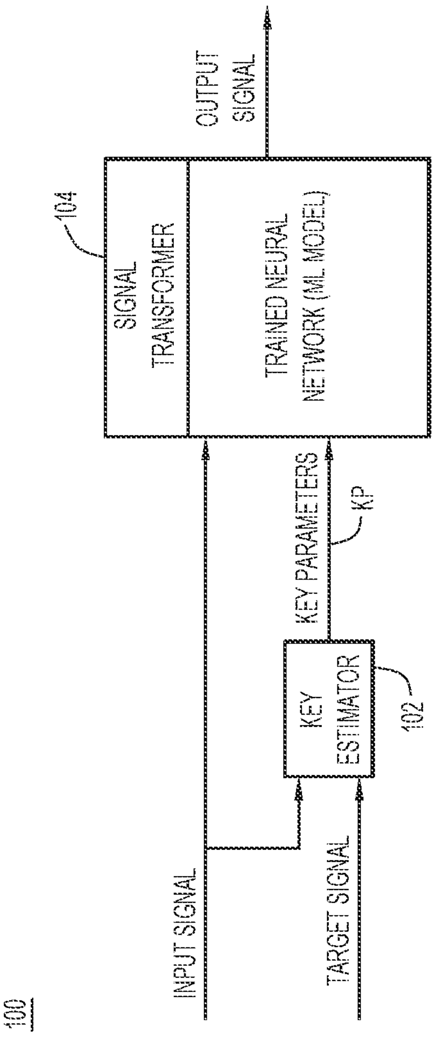
FIG. 1 is a high-level block diagram of an example system configured with a trained neural network model to perform dynamic key-guided signal transformations.

With reference to FIG. 1, there is a high-level block diagram of an example system 100 configured with a trained neural network model to perform dynamic key-guided/key-based signal transformations. System 100 is presented as a construct useful for describing concepts employed in different embodiments presented below. As such, not all of the components and signals presented in system 100 apply to all of the different embodiments, as will be apparent from the ensuing description.

System 100 includes a key generator or estimator 102 and a key-guided signal transformer 104 that may be deployed in a transmitter (TX)/receiver (RX) (TX/RX) system. In an example, key estimator 102 receives key generation data that may include at least an input signal, a target or desired signal, a transformation index or a signal transformation mapping. Based on the key generation data, the key estimator 102 generates or estimates a set of transform parameters KP, also referred to as "key parameters" KP. Key estimator 102 may estimate key parameters KP on a frame-by-frame basis, or over a group of frames, as described below. Key parameters KP parameterize or represent a desired/target signal characteristic of the target signal, such as a spectral/frequency-based characteristic or a temporal/time-based characteristic of the target signal, for example. In the TX/RX system, key parameters KP are estimated at transmitter TX and then transmitted to receiver RX along with the input signal.

At receiver RX, signal transformer 104 receives the input signal and key parameters KP transmitted by transmitter TX. Signal transformer 104 performs a desired signal transformation of the input signal based on key parameters KP, to produce an output signal having an output signal characteristic similar to or that matches the desired/target signal characteristic of the target signal.

Signal transformer 104 includes a previously trained neural network model configured to perform the desired KP-driven signal transformation. The neural network (NN) may be a convolutional neural network (CNN) that includes a series of neural network layers with convolutional filters having weights or coefficients that are configured based on a conventional stochastic gradient-based optimization algorithm. In another example, the neural network may be based on a recurrent neural network (RNN) model. In an embodiment, the neural network includes a machine learning (ML) model trained to be uniquely configured by key parameters KP to perform a dynamic key-guided signal transformation of the input signal, to produce the output signal, such that one or more output signal characteristics match or follow one or more desired/target signal characteristics. For example, key parameters KP configure the ML model of the neural network to perform the signal transformation such that spectral or temporal characteristics of the output signal match corresponding desired/target spectral or temporal characteristics of the target signal. The aforementioned processing performed by signal transformer 104 of system 100 is referred to as "inference-stage" processing because the processing is performed by the neural network of the signal transformer after the neural network has been trained.

In an example in which the input signal and the target signal include respective sequences of signal frames, e.g., respective sequences of audio frames, key estimator 102 estimates key parameters KP on a frame-by-frame basis to produce a sequence of frame-by-frame key parameters, and the ML model of the neural network of signal transformer 104 is configured by the key parameters to perform the signal transformation of the input signal to the output signal on the frame-by-frame basis. That is, the neural network produces a uniquely transformed output frame for/corresponding to each given input frame, due to the frame-specific key parameters used to guide the transformation of the given input frame. Thus, as the desired/target signal characteristics dynamically vary from frame-to-frame and the estimated key parameters that represent the desired/target signal characteristics correspondingly vary from fame-to-frame, the key-guided signal transformation will correspondingly vary frame-by-frame to cause the output frames have signal characteristics that track those of the target frames. In this way, the neural network of signal transformer 104 performs dynamic, key-guided signal transformations on the input signal, to produce the output signal that matches the target signal characteristics over time. In the ensuing description, signal transformer 104 is also referred to as "neural network" 104.

In various embodiments, the input signal may represent a pre-processed input signal that is representative of the input signal and the target signal may represent a pre-processed target signal that is representative of the target signal, such that key estimator 102 estimates key parameters KP based on the pre-processed input and target signals, and neural network 104 performs the signal transformation on the pre-processed input signal. In another embodiment, key parameters KP may represent encoded key parameters, such that the encoded key parameters configure neural network 104 to perform the signal transformation of the input signal or pre-processed input signal. Also, the input signal may represent an encoded input signal, or an encoded, pre-processed input signal, such that key estimator 102 and neural network 104 each operate on the encoded input signal or the encoded pre-processed input signal. All of these and further variations are possible in various embodiments, some of which will be described below.

By way of example, various aspects of system 100 are now described in a context in which the input signal and the target signal are respective audio signals, i.e., "input audio" and "target audio." It is understood that the embodiments presented herein apply equally to other contexts, such as a context in which the input signal and the target signal include respective radio frequency (RF) signals, image, video, and so on. In the audio context, the target signal may be a speech or audio signal sampled at, e.g., 32 kHz, and buffered, e.g., as frames of 32 ms corresponding to 1024 samples per frame. Similarly, the input signal may be a speech or audio signal that is, for example:

a. Sampled at either the same sample rate as the target signal (e.g., 32 kHz) or sampled at a different sampling rate (e.g., 16 kHz, 44.1 kHz, or 48 kHz).
b. Buffered at either the same frame duration as the target signal (e.g., 32 ms) or a different duration (e.g., 16 ms, 20 ms, or 40 ms).
c. A bandlimited version of the target signal. For example, the target signal is a full-band audio signal including frequency content up to a Nyquist frequency, e.g., 16 kHz, while the input signal is bandlimited with audio frequency content that is less than that of the target signal, e.g., up to 4 kHz, 8 kHz, or 12 kHz. This "bandlimited" scenario is referred to as "Example-A."
d. A distorted version of the target signal. For example, the input signal contains unwanted noise or temporal/spectral distortions of the target signal. This "distorted" scenario is referred to as "Example-B."
e. Not perceptually or intelligibly related to the target signal. For example, the input signal includes speech/dialog, while target signal includes music; or the input signal includes music for instrument-1 while the target signal includes music from another instrument, and so on. This "perceptual" scenario is referred to as "Example-C."

In an embodiment, the input signal and the target signal may each be pre-processed to produce a pre-processed input signal and a pre-processed target signal upon which key estimator 102 and neural network 104 operate. Example pre-processing operations that may be performed on the input signal and the target signal include one or more of: resampling (e.g., down-sampling or up-sampling); direct current (DC) filtering to remove low frequencies, e.g., below 50 Hz; pre-emphasis filtering to compensate for a spectral tilt in the input signal; and/or adjusting gain such that the input signal is normalized before its subsequent signal transformation.

As mentioned above, key estimator 102 estimates key parameters KP used to guide/configure neural network 104 to perform the signal transformation on the input signal. To estimate key parameters KP, key estimator 102 may perform a variety of different analysis operations on the input signal and the target signal, to produce corresponding different sets of key parameters KP. In one example, key estimator 102 performs linear prediction (LP) analysis of at least one of the target signal, the input signal, or an intermediate signal generated based on the target and input signals. The LP analysis produces LP coefficients (LPCs) and line spectral frequencies (LSFs) that, in general, compactly represent a broader spectral envelope of the underlying signal, i.e., the target signal, the input signal, or the intermediate signal. The LSFs compactly represent the LPCs where they exhibit good quantization and frame-to-frame interpolation properties. In both Example-A and Example-B, the LSFs of the target signal (i.e., which represents a reference or ground truth) serve as a good representation for neural network 104 to learn or mimic the spectral envelope of the target signal (i.e., the target spectral envelope) and impose a spectral transformation on the spectral envelope of the input signal (i.e., the input spectral envelope) to produce a transformed signal (i.e., the output signal) that has that target spectral envelope. Thus, in this case, key parameters KP represent or form the basis for a "spectral envelope key" that includes spectral envelope key parameters. The spectral envelope key configures neural network 104 to transform the input signal to the output signal, such that the spectral envelope of the output signal (i.e., the output spectral envelope) matches or follows the target spectral envelope. In a specific non-limiting example of generating key parameters, the input signal is transformed according to a whitening filter represented by a linear prediction polynomial with LPC order L=2 (e.g., a 2-pole filter), to produce an output signal. LPCs for the linear prediction polynomial are estimated during training, to achieve estimated LPCs that drive the output signal to match the target signal (e.g., based on any of various error/loss functions associated with the desire for whitening of the input signal). Then, the estimated LPCs are converted to LSFs (ranging from 0 to pi) and quantized using a 6-bit scalar quantizer per LSF to generate key parameters. The 6-bit scalar quantizer yields a total of 12-bits or 4096 possible combinations of unique keys; however, in this example, there are 2 keys corresponding to the 2 pole locations.

In another example, key estimator 102 performs frequency harmonic analysis of at least one of the target signal, the input signal, or an intermediate signal generated based on the target and input signals. The harmonic analysis generates as key parameters KP a representation of a subset of dominant tonal harmonics that are, e.g., present in the target signal and are in/missing from the input signal. Key estimator 102 estimates the dominant tonal harmonics using, e.g., a search on spectral peaks, or a sinusoidal analysis/synthesis algorithm. In this case, key parameters KP represent or form the basis of a "harmonic key" comprising harmonic key parameters. The harmonic key configures neural network 104 to transform the input signal to the output signal, such that the output signal includes the spectral features that are present in the target signal, but absent from the input signal. In this case, the signal transformation may represent a signal enhancement of the input signal to produce the output signal with perceptually-improved signal quality, which may include frequency bandwidth extension (BWE), for example. The above-described LP analysis that produces LSFs and harmonic analysis are each examples of spectral analysis.

In yet another example, key estimator 102 performs temporal analysis (i.e., time-domain analysis) of at least one of the target signal, or an intermediate signal generated based on the target and input signals. The temporal analysis produces key parameters KP as parameters that compactly represent temporal evolution in a given frame (e.g., gain variations), or a broad temporal envelope of either the target signal or the intermediate signal (generally referred to as "temporal amplitude" characteristics), for example. In both the bandlimited Example-A and distorted Example-B, the temporal features of the target signal (i.e., the reference or ground truth) serve as a good prototype for neural network 104 to learn or mimic the temporal fine structure of the target signal (i.e., the desired temporal fine structure) and impose this temporal feature transformation on the input signal. In this case, key parameters KP represent or form the basis for a "temporal key" comprising temporal key parameters. The temporal key configures neural network 104 to transform the input signal to the output signal such that the output signal has the desired temporal envelope.

Figure 2:
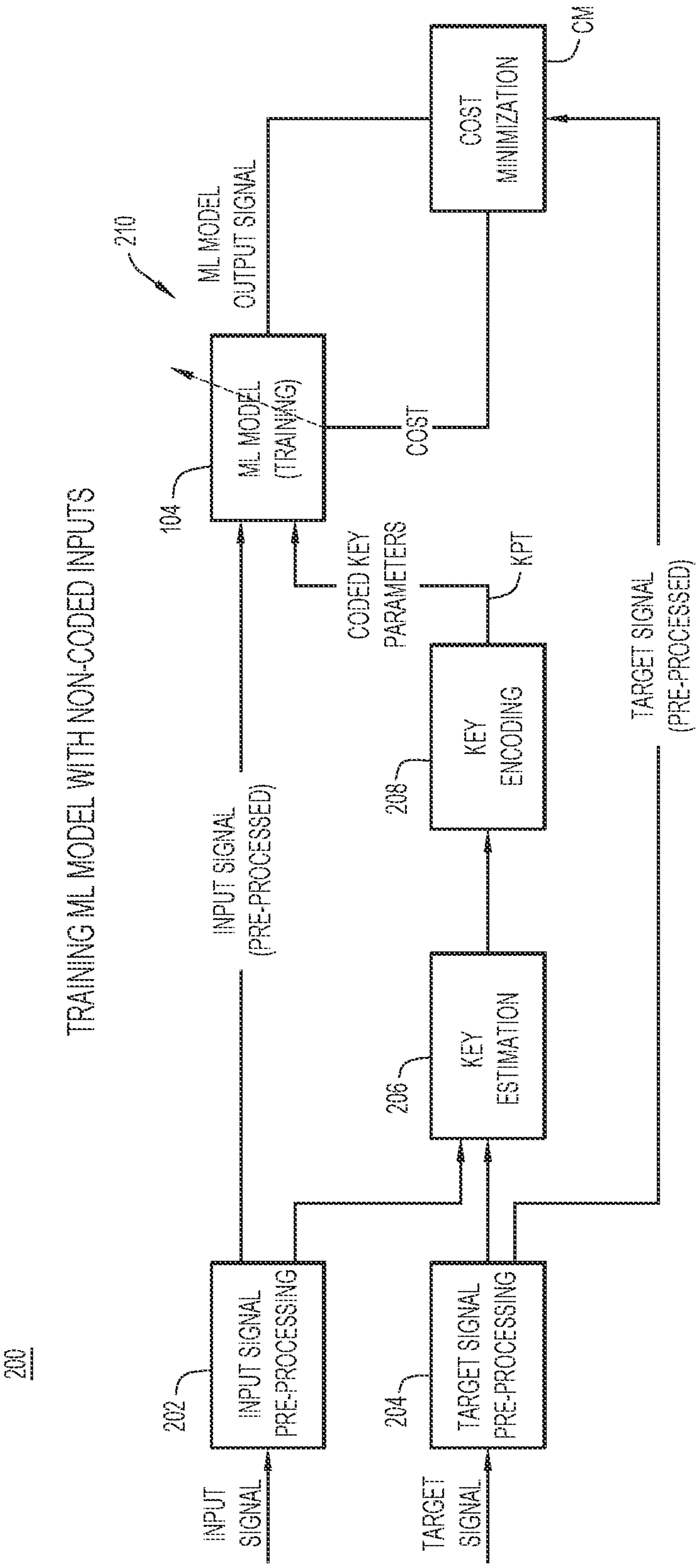
FIG. 2 is a flow diagram of a first example training process used to train a machine learning (ML) model of a neural network of the system of FIG. 1 to perform a signal transformation.

The above-described key estimation/generation and inference-stage processing relies on a trained ML model of the neural network 104. Various processes employed to train the ML model of neural network 104 to perform dynamic key-guided signal transformations are described below in connection with FIGS. 2 and 3. With reference to FIG. 2, there is a flow diagram of a first example training process 200 that employs various training signals to train the ML model. The training signals include a training input signal (e.g., training input audio), a training target signal (e.g., training target audio), and training key parameters that have signal characteristics/properties generally similar to the input signal, the target signal, and key parameters KP used for inference-stage processing in system 100, for example; however, the training signals and the inference-stage signals are not the same signals. In the example of FIG. 2, training process 200 trains the ML model using a non-coded version of the input signal. Also, training process 200 operates on a frame-by-frame basis, i.e., the training process operates on each frame of the input signal and corresponding concurrent frame of the target signal At 202, the training process pre-processes an input signal frame to produce a pre-processed input signal frame. Example input signal pre-processing operations include resampling; DC filtering to remove low frequencies, e.g., below 50 Hz; pre-emphasis filtering to compensate for a spectral tilt in the input signal; and/or adjusting gain such that the input signal is normalized before a subsequent signal transformation. Similarly, at 204, the training process pre-processes the corresponding target signal frame, to produce a pre-processed target signal frame. The target signal pre-processing may perform all or a subset of the operations performed by the pre-processing of the input signal.

At 206, the training process estimates for the input signal frame a corresponding set of key parameters that are to guide a subsequent signal transformation of the (pre-processed) input signal frame. To estimate the key parameters, the training system may perform a variety of different analysis operations on the input signal frame, and the corresponding target signal frame, to produce corresponding different sets of the key parameters, in the manner described above in connection with the key estimation/generation and inference-stage processing. For example, the training system may perform the above-described LP analysis, frequency harmonic analysis, and/or temporal analysis of at least one of the input signal frame, the corresponding target signal frame, and an intermediate signal frame based on the input signal frame and the corresponding target signal frame, to produce a spectral envelope key, a harmonic key, and/or a temporal key, respectively, for the input signal frame.

At 208, the training system encodes the key parameters to produce encoded key parameters KPT, i.e., an encoded version of the key parameters for the input signal frame. Encoding of the key parameters may include, but not be limited to, quantizing at least one or a subset of the key parameters, and encoding the key parameters using scalar or vector quantizer codebooks.

At 210, the ML model of neural network 104 receives the pre-processed input signal frame and the encoded key parameters KPT for the input signal frame. In addition, the pre-processed target signal frame is provided to a cost minimizer CM employed for training. Encoded key parameters KPT configure the ML model to perform a signal transformation on the pre-processed input signal frame, to produce an output signal frame. Cost minimizer CM implements a loss function to generate a current cost/error based on differences or similarity between the output signal frame and the target signal frame. The error may represent a deviation of a desired signal characteristic of the target signal frame from a corresponding signal characteristic of the input signal frame. Weights of the ML model are updated/trained based on the error to reduce the deviation using, e.g., any known or hereafter developed back propagation technique to update the weights of a neural network to minimize a loss function. The loss function may be implemented using any known or hereafter developed techniques for implementing a loss function to be used for training an ML model. For example, the loss function implementation may include estimating mean-squared error (MSE) or absolute error between the target signal and the model output signal produced by the signal transformer (model). The target signal and the model output signal may be in the time domain, the spectral domain, or in key parameter domain. The domain here corresponds to the representation of the target and model output signals, where the spectral domain corresponds to the frequency-domain (e.g., Discrete-Fourier Transform (DFT)) representation of the signals, and the key parameter domain corresponds to the parametric representation (e.g., linear prediction coefficients, tonality, spectral-tilt factor, prediction gain that are known to those skilled in the art) of the signals (e.g., LPCs, tonality, spectral-tilt factor, and/or prediction gain) that are known to those skilled in the art. In another example embodiment, the loss function may be implemented as a weighted combination of multiple errors estimated in the time-domain, the spectral domain, and/or the key parameter domain.

Operations 202-210 repeat for successive input and corresponding target signal frames to cause the key parameters to configure the ML model over time to perform the signal transformation on the input signal such that the output signal characteristic of the output signal matches the target signal characteristic targeted by the signal transformation. Once the ML model has been trained over many frames of the input signal, the trained ML model (i.e., the trained ML model of neural network 104) may be deployed for inference-stage processing of an (inference-stage) input signal based on (inference-stage) key parameters.

Figure 3:
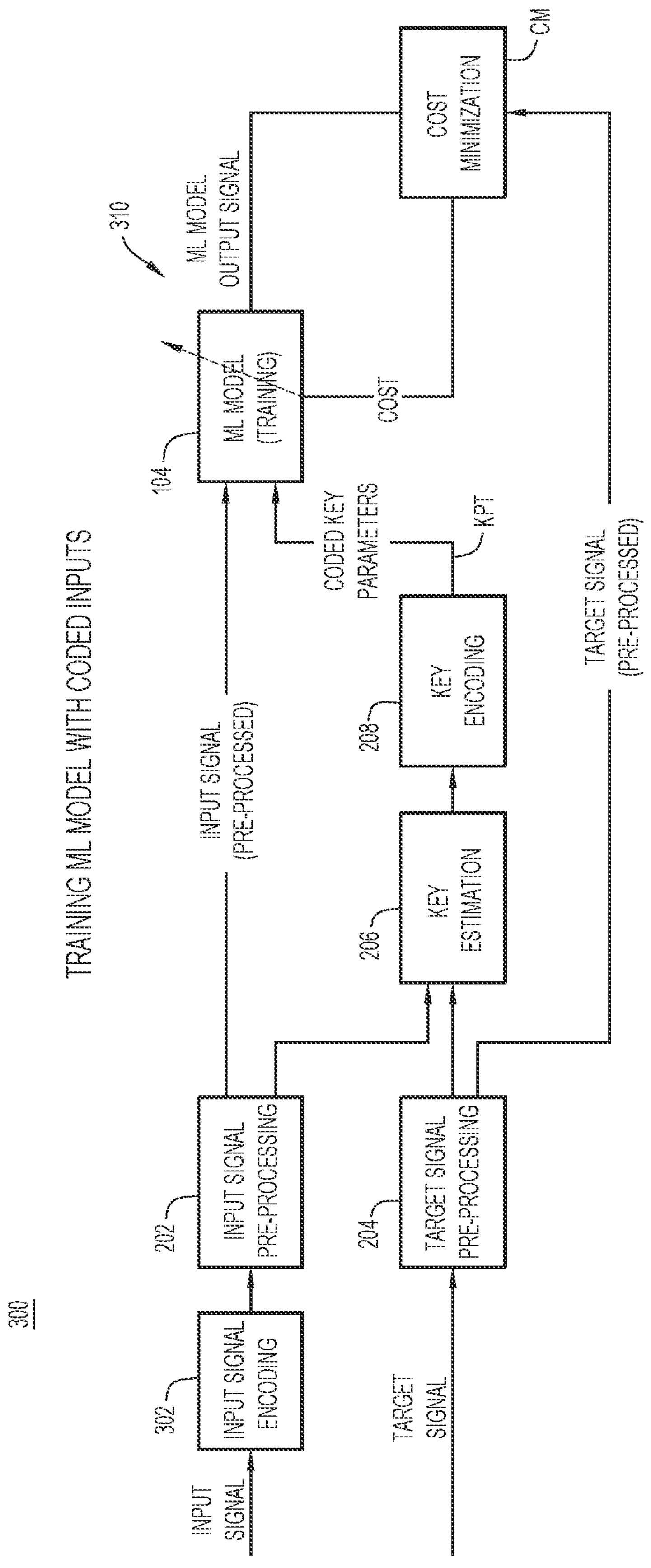
FIG. 3 is a flow diagram of a second example training process used to train the ML model to perform a signal transformation.

With reference to FIG. 3, there is a flow diagram of a second example training process 300 used to train the ML model. Training process 300 is similar to training process 200, except that training process 300 trains the ML model using a coded version of the input signal. The above description of operations 202-208, generally common to both training process 200 and 300, shall suffice for the description of their corresponding functions in training process 300, and thus will not be repeated; however, training process 300 includes an additional encoding operation 302. Encoding operation 302 encodes the input signal to produce an encoded input signal. Encoding operation 302 may encode the input signal using any known or hereafter developed waveform preserving audio compression technique. Signal pre-processing operation 202 then performs its pre-processing on the encoded input signal, to produce an encoded, pre-processed input signal. Signal pre-processing operation 202 provides the encoded pre-processed input signal to the ML model for training operation 310, which proceeds in similar fashion to operation 210.

Figure 4:
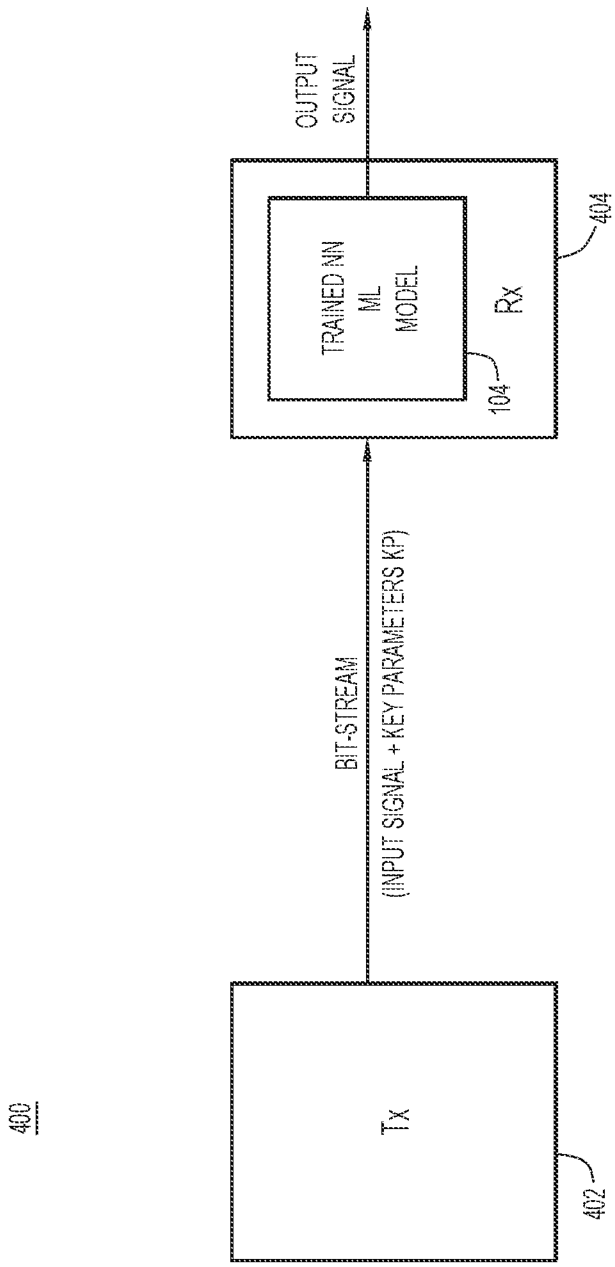
FIG. 4 is a block diagram of an example high-level communication system in which the neural network, once trained, may be deployed to perform inference-stage key-guided signal transformations.

With reference to FIG. 4, there is a block diagram of an example high-level communication system 400 in which trained neural network 104 may be deployed to perform inference-stage key-guided signal transformations. Communication system 400 includes a transmitter (TX) 402, in which key estimator 102 may be deployed, and a receiver (RX) 404, in which trained neural network 104 is deployed. At a high-level, transmitter 402 generates a bit-stream including an input signal to and key parameters (e.g., key parameters KP) to guide a transformation of the input signal, and transmits the bit-stream over a communication channel. Receiver 404 receives the bit-stream from the communication channel, and recovers the input signal and the key parameters from the bit-stream. Trained neural network 104 of receiver 404, performs its inference processing and transforms the input signal recovered from the bit stream based on key parameters recovered from the bit stream, to produce an output signal. Key estimation/generation and inference-stage processing performed in transmitter 402 and receiver 404 are described below in connection with FIGS. 5-7.

Figure 5:
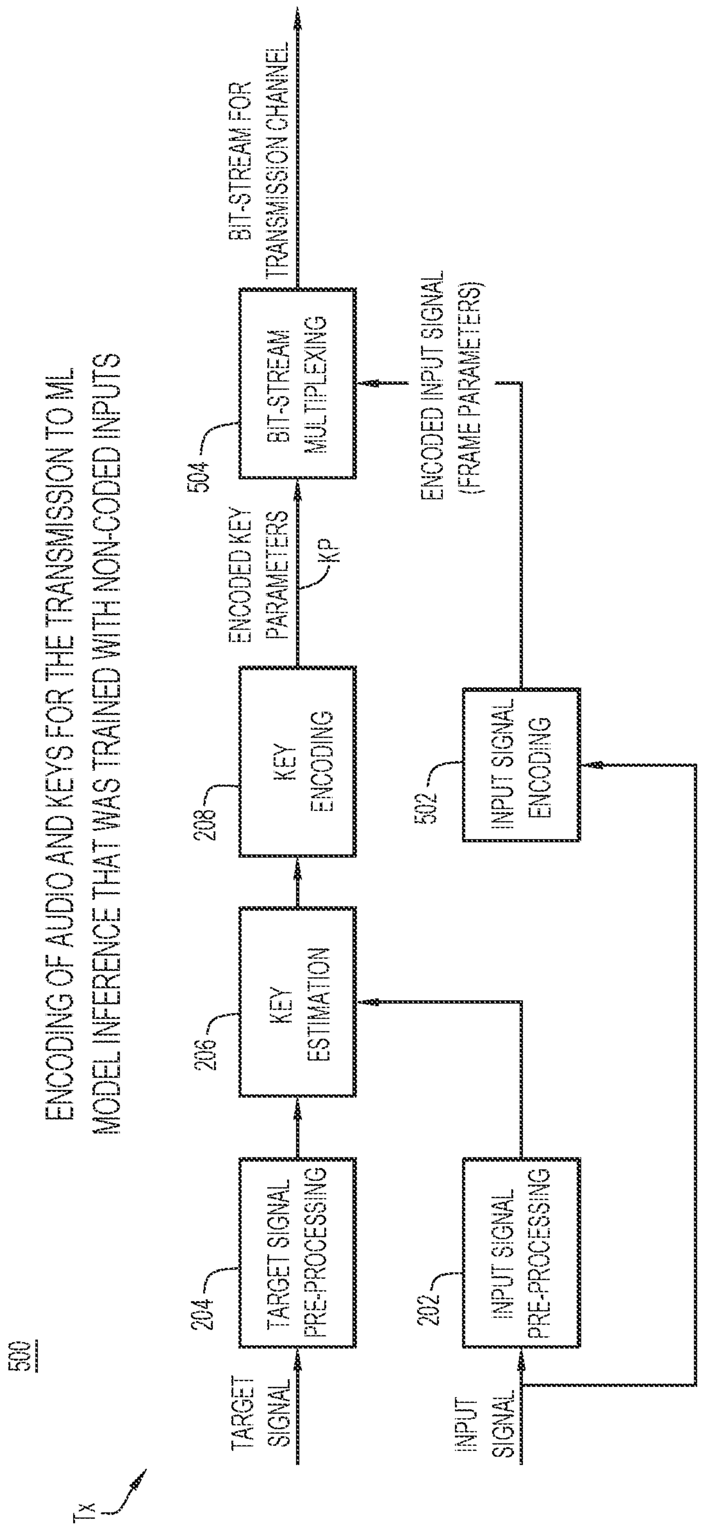
FIG. 5 is a flow diagram of a first example transmitter process, performed in a transmitter of the communication system, to produce a bit-stream compatible with the ML model when trained with a non-coded input signal.

With reference to FIG. 5, there is a flow diagram of a first example transmitter process 500 performed by transmitter 402 to produce a bit-stream compatible with the ML model of neural network 104 trained previously with a non-coded input signal, e.g., trained according to training process 200. Transmitter process 500 operates on a full set of signals, e.g., input signal, target signal, and key parameters KP, that have similar statistical characteristics as the corresponding training signals of training process 200. Also, transmitter process 500 employs many of the operations employed by training process 200. The above description of operations 202-208, generally common to both training process 200 and transmitter process 500, shall suffice for the transmitter process, and thus will not be repeated in detail.

Transmitter process 500 includes operations 202 and 204 to provide to key estimating operation 206 a pre-processed input signal and a pre-processed target signal, respectively. Next, key estimating operation 206 and key encoding operation 208 collectively generate encoded key parameters KP from the pre-processed input and target signals. Next, an encoding operation 502 encodes the input signal to produce an encoded/compressed input signal. Finally, a bit-stream multiplexing operation 504 multiplexes the encoded input signal and the encoded key parameters into the bit-stream (i.e., a multiplexed signal) for transmission by transmitter 402 over the communication channel.

Figure 6:
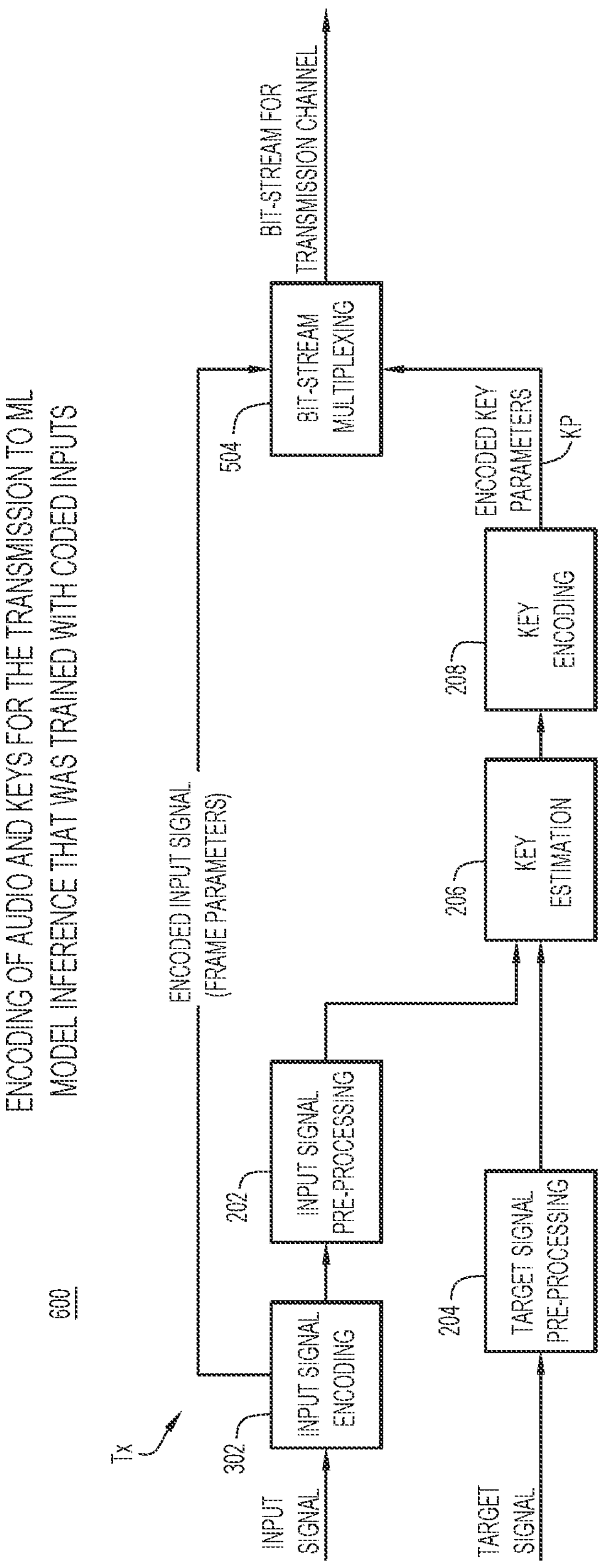
FIG. 6 is a flow diagram of a second example transmitter process, performed in the transmitter of the communication system, to produce a bit-stream compatible with the ML model when trained with a coded input signal.

With reference to FIG. 6, there is a flow diagram of a second example transmitter process 600 performed by transmitter 402 to produce a bit-stream compatible with the ML model of neural network 104 trained with a coded input signal, e.g., trained according to training process 300. Transmitter process 600 operates on a full set of signals that have similar statistical characteristics as the training signals of training process 300. In addition, transmitter process 600 employs many of the operations employed by training process 300. The above description of operations 202-208 and 302, generally common to both training process 300 and transmitter process 600, shall suffice for the transmitter process, and thus will not be repeated in detail.

Transmitter process 600 includes operations 302 and 202 that collectively provide to both key estimating operation 206 and bit-stream multiplexing operation 504 an encoded pre-processed input signal. Also, operation 204 provides a pre-processed target signal to key estimating operation 206. Next, key generating operations 206 and 208 collectively generate encoded key parameters KP based on the encoded pre-processed input signal and the pre-processed target signal. Finally, bit-stream multiplexing operation 504 multiplexes the encoded input signal and the encoded key parameters into the bit-stream for transmission by transmitter 402 over the communication channel.

Figure 7:
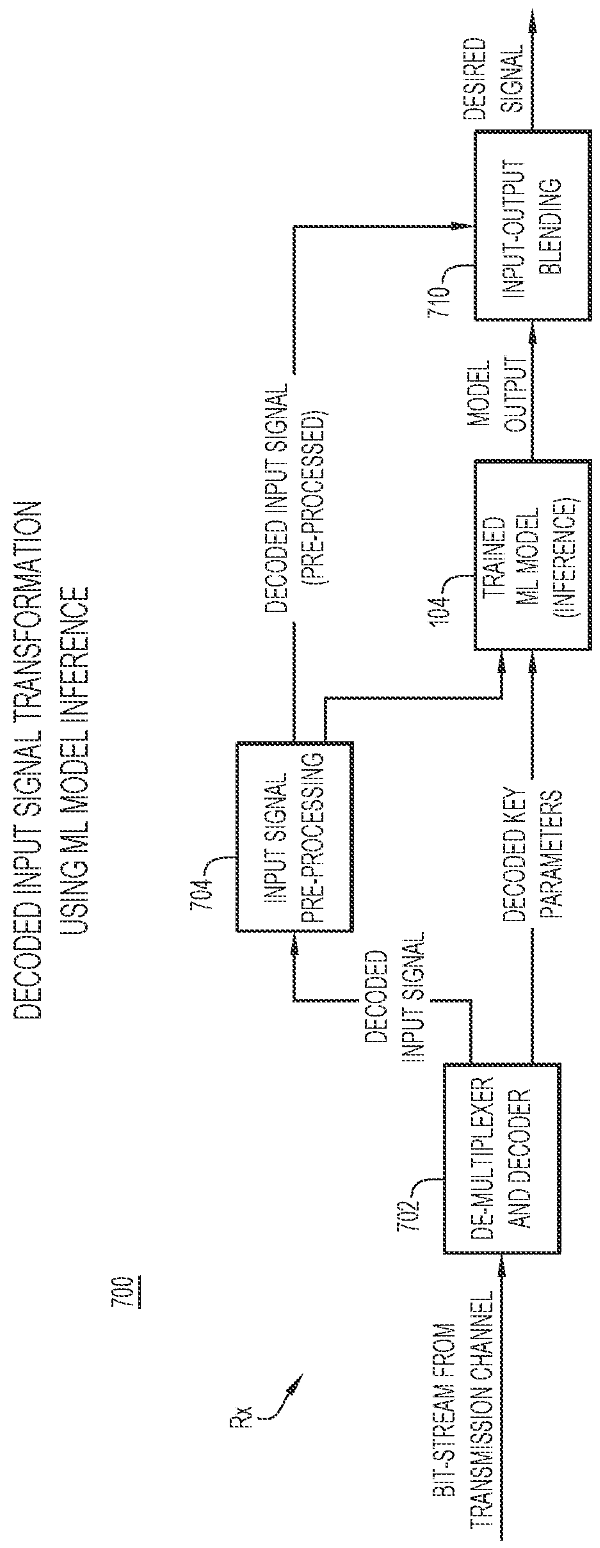
FIG. 7 is a flow diagram of an example inference-stage receiver process performed in a receiver of the communication system.

With reference to FIG. 7, there is a flow diagram of an example inference-stage receiver process 700 performed by receiver 404. Receiver process 700 receives the bit-stream transmitted by transmitter 402. Receiver process 700 includes a demultiplexer-decoder operation 702 (also referred to simply as a "decoder" operation) to demultiplex and decode the encoded input signal and the encoded key parameters from the bit-stream, to recover local copies/ versions of the input signal and the key parameters (respectively labeled as "decoded input signal" and "decoded key parameters" in FIG. 7).

Next, an optional input signal pre-processing operation 704 pre-processes the input signal from bit-stream demultiplexer-decoder operation 702, to produce a pre-processed version of the input signal that is representative of the input signal. Based on the key parameters, the ML model of neural network 104 performs a desired signal transformation on the pre-processed version of the input signal, to produce an output signal (labeled "model output" in FIG. 7). In an embodiment that omits pre-processing input signal pre-processing operation 704, the ML model of neural network 104 performs the desired signal transformation on the input signal, directly. The processed version of the input signal and the input signal may each be referred to more generically as "a signal that is representative of the input signal."

Receiver process 700 may also include an input-output blending operation 710 to blend the pre-processed input signal with the output signal. Input-output blending operation 710 may include one or more of the following operations performed on a frame-by-frame basis:

a. A constant-overlap-add (COLA) windowing, for example, with 50% hop and overlap-add of two consecutive windowed frames.
b. Blending of windowed/filtered versions of the output signal and the pre-processed input signal to generate the desired signal, the goal of the blending being to control characteristics of the desired signal in a region of spectral overlap between the output signal and the pre-processed input signal. Blending may also include post-processing of the output signal based on the key parameters to control the overall tonality and noisiness in the output signal.

In summary, process 700 includes (i) receiving input audio and key parameters representative of a target audio characteristic, and (ii) configuring neural network 104, that was previously trained to be configured by the key parameters, with the key parameters to cause the neural network to perform a signal transformation of audio representative of the input audio (e.g., either the input audio or a pre-processed version of the input audio), to produce output audio with an output audio characteristic that matches the target audio characteristic. The key parameters may represent a target spectral characteristic as the target audio characteristic, and the configuring includes configuring neural network 104 with the key parameters to cause the neural network to perform the signal transformation of an input spectral characteristic of the input audio to an output spectral characteristics of the output audio that matches the target spectral characteristic.

Figure 8:
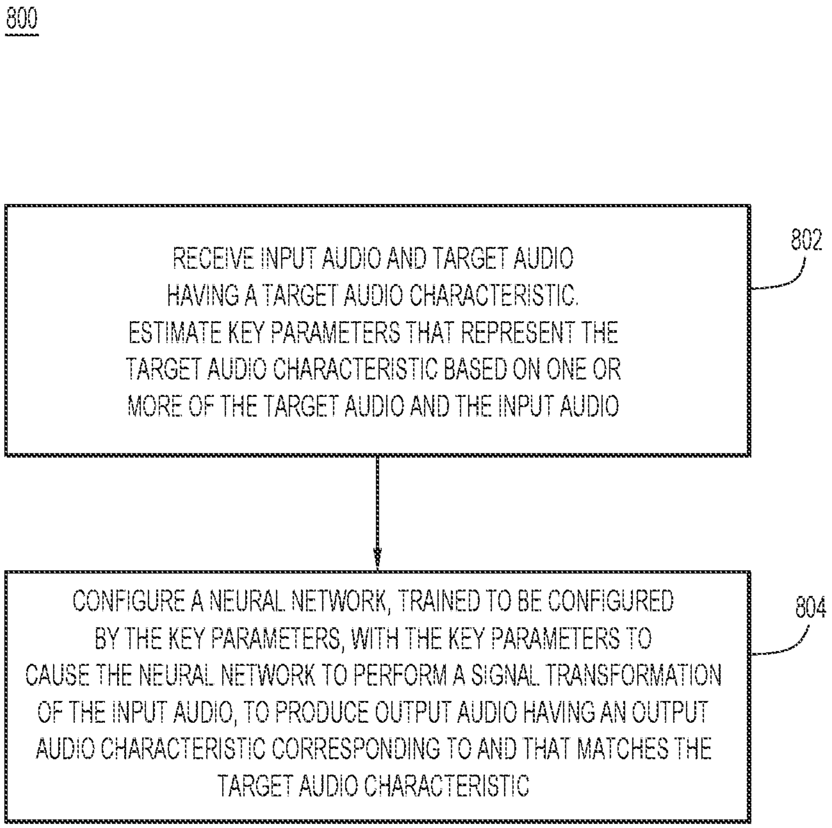
FIG. 8 is a flowchart of an example method of performing a key-guided signal transformation using a neural network trained previously to be configured by key parameters to perform the signal transformation.

With reference to FIG. 8, there is a flowchart of an example method 800 of performing a key-guided signal transformation using a neural network (e.g., neural network 104) trained previously to be configured by key parameters to perform the signal transformation, i.e., to perform the signal transformation based on the key parameters.

At 802, a key estimator receives input audio and target audio having a target audio characteristic. The input audio and target audio may each include a sequence of audio frames. The key estimator estimates key parameters that represent the target audio characteristic based on one or more of the target audio and the input audio. The key estimator may perform spectral and/or temporal analysis of the input and target audio to produce the key parameters, as described above. The key estimator may estimate the key parameters on a frame-by-frame basis to produce a sequence of frame-by-frame key parameters. The key estimator provides the key parameters to a first input of the trained neural network.

At 804, the trained neural network also receives the input audio at a second input of the neural network. The key parameters configure the trained neural network to perform a desired signal transformation. Responsive to the key parameters, the trained neural network performs the desired signal transformation of the input audio (i.e., of an input audio characteristic of the input audio), to produce output audio having an output audio characteristic that matches the target audio characteristic. That is, the signal transformation transforms the input audio characteristic to the output audio characteristic that matches or is similar to the target audio characteristic. The trained neural network may be configured by the sequence of frame-by-frame key parameters on a frame-by-frame basis to transform each input audio frame to a corresponding output audio frame, to produce the output audio as a sequence of output audio frames (one output audio frame per one input audio frame and per set of frame-by-frame key parameters).

During an a priori training stage, the neural network was trained to perform the signal transformation so as to minimize an error between the output audio and the target audio. For example, the neural network was trained by training weights of the neural network to cause the neural network to perform a signal transformation of training input audio to produce training output audio responsive to training key parameters, so as to minimize the error.

Figure 9:
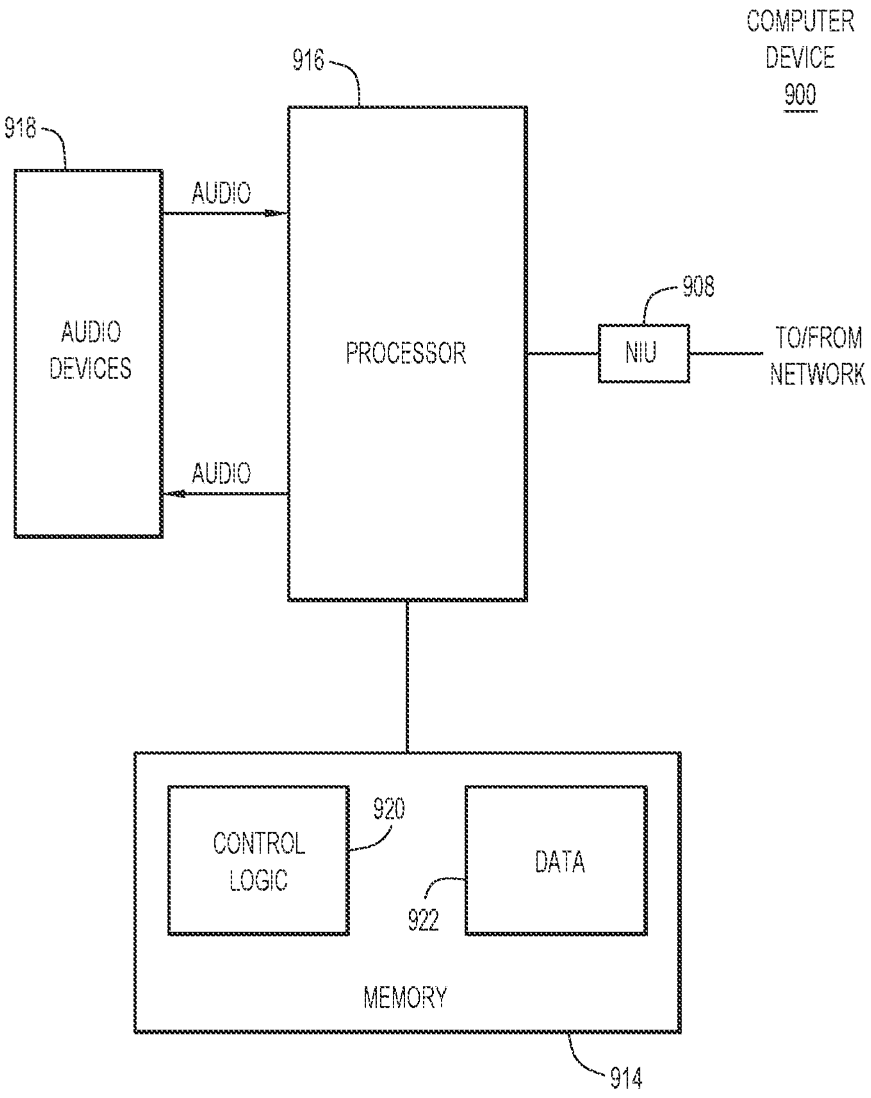
FIG. 9 is a block diagram of a computer device configured to implement embodiments presented herein.

With reference to FIG. 9, there is a block diagram of a computer device 900 configured to implement embodiments presented herein. There are numerous possible configurations for computer device 900 and FIG. 9 is meant to be an example. Examples of computer device 900 include a tablet computer, a personal computer, a laptop computer, a mobile phone, such as a smartphone, and so on. Computer device 900 includes one or more network interface units (NIUs) 908, and memory 914 each coupled to a processor 916. The one or more NIUs 908 may include wired and/or wireless connection capability that allows processor 916 to communicate over a communication network. For example, NIUs 908 may include an Ethernet card to communicate over an Ethernet connection, a wireless RF transceiver to communicate wirelessly with cellular networks in the communication network, optical transceivers, and the like, as would be appreciated by one of ordinary skill in the relevant arts. Processor 916 receives sampled or digitized audio, and provides digitized audio to, one or more audio devices 918, as is known. Audio devices 918 may include microphones, loudspeakers, analog-to-digital converters (ADCs), and digital-to-analog converters (DACs).

Processor 916 may include a collection of microcontrollers and/or microprocessors, for example, each configured to execute respective software instructions stored in the memory 914. Processor 916 may implement an ML model of a neural network. Processor 916 may be implemented in one or more programmable application specific integrated circuits (ASICs), firmware, or a combination thereof. Portions of memory 914 (and the instructions therein) may be integrated with processor 916. As used herein, the terms "acoustic," "audio," and "sound" are synonymous and interchangeable.

The memory 914 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 914 may comprise one or more computer readable storage media (e.g., a memory device) encoded with software comprising computer executable instructions and when the software is executed (by the processor 916) it is operable to perform the operations described herein. For example, the memory 914 stores or is encoded with instructions for control logic 920 to implement modules configured to perform operations described herein related to the ML model of the neural network, the key estimator, input/target signal pre-processing, input signal and key encoding and decoding, cost minimization, bit-stream multiplexing and demultiplexing, input-output blending (post-processing), and the methods described above.

In addition, memory 914 stores data/information 922 used and generated by processor 916, including key parameters, input audio, target audio, and output audio, and coefficients and weights employed by the ML model of the neural network.

In summary, in one embodiment, a method is provided comprising: receiving input audio and target audio having a target audio characteristic; estimating key parameters that represent the target audio characteristic based on one or more of the target audio and the input audio; and configuring a neural network, trained to be configured by the key parameters, with the key parameters to cause the neural network to perform a signal transformation of the input audio, to produce output audio having an output audio characteristic corresponding to and that matches the target audio characteristic.

In another embodiment, an apparatus is provided comprising: a key estimator to receive input audio and target audio having a target audio characteristic, and to estimate key parameters that represent the target audio characteristic based on one or more of the target audio and the input audio; and a neural network trained to be configured by the key parameters to perform a signal transformation of the input audio, to produce output audio having an output audio characteristic corresponding to and that matches the target audio characteristic.

In yet another embodiment, a non-transitory computer readable medium is provided. The medium is encoded with instructions that, when executed by a processor, cause the processor perform: receiving input audio and target audio having a target audio characteristic; estimating key parameters that represent the target audio characteristic based on one or more of the target audio and the input audio; and configuring a neural network (implemented by the instructions), trained to be configured by the key parameters, with the key parameters to cause the neural network to perform a signal transformation of the input audio, to produce output audio having an output audio characteristic corresponding to and that matches the target audio characteristic.

In another embodiment, an apparatus is provided comprising: a decoder to decode encoded input audio and encoded key parameters, to produce input audio and key parameters, respectively; and a neural network trained to be configured by the key parameters to perform a signal transformation of audio representative of the input audio (e.g., either the input audio itself or a pre-processed version of the input audio), to produce output audio. the key parameters represent a target audio characteristic, and the neural network is trained to be configured by the key parameters to perform the signal transformation of an input audio characteristic of the input audio to an output audio characteristic of the output audio that matches the target audio characteristic.

In a further embodiment, a method is provided comprising: receiving input audio and key parameters representative of a target audio characteristic; and configuring a neural network, that was previously trained to be configured by the key parameters, with the key parameters to cause the neural network to perform a signal transformation of audio representative of the input audio, to produce output audio with an output audio characteristic that matches the target audio characteristic.

In another embodiment, a non-transitory computer readable medium is provided. The medium is encoded with instructions that, when executed by a processor, cause the processor perform: receiving input audio and key parameters representative of a target audio characteristic; and configuring a neural network, that was previously trained to be configured by the key parameters, with the key parameters to cause the neural network to perform a signal transformation of audio representative of the input audio, to produce output audio with an output audio characteristic that matches the target audio characteristic.

Although the techniques are illustrated and described herein as embodied in one or more specific examples, it is nevertheless not intended to be limited to the details shown, since various modifications and structural changes may be made within the scope and range of equivalents of the claims.

Each claim presented below represents a separate embodiment, and embodiments that combine different claims and/or different embodiments are within the scope of the disclosure and will be apparent to those of ordinary skill in the art after reviewing this disclosure.

What is claimed is:

1. A method comprising:

receiving input audio and target audio having a target audio characteristic, wherein the input audio and the target audio are received as separate signals;

estimating frame-specific key parameters that include quantized representations of the target audio characteristic derived from a joint analysis of corresponding frames from the target audio and the input audio, wherein the frame-specific key parameters vary from frame to frame, wherein the quantized representations are based on an analysis including a temporal analysis and at least one of a spectral analysis or a frequency harmonic analysis;

encoding the input audio and the frame-specific key parameters;

multiplexing the encoded frame-specific key parameters in alignment with the encoded input audio at a frame level into a combined bit-stream for transmission to a neural network;

demultiplexing the combined bit-stream to generate decoded input audio and decoded frame-specific key parameters;

configuring the neural network, trained to be configured by the frame-specific key parameters, with the decoded frame-specific key parameters to cause the neural network to perform a signal transformation of the decoded input audio; and producing output audio having an output audio characteristic corresponding to and that matches the target audio characteristic, wherein the output audio has perceptually-improved signal quality with frequency bandwidth extension as compared to the decoded input audio.

2. The method of claim 1, wherein the output audio includes a target temporal characteristic and a temporal characteristic, which are each a respective temporal amplitude characteristic.

3. The method of claim 1, wherein the estimating the frame-specific key parameters includes: estimating as temporal key parameters temporal key parameters that represent a temporal amplitude characteristic of the target audio, wherein the estimating further includes at least one of: spectral envelope key parameters including LP coefficients (LPCs) or line spectral frequencies (LSFs) representative of a target spectral envelope of the target audio; and harmonic key parameters that represent harmonics present in the target audio.

4. The method of claim 1, wherein:

the input audio and the target audio include respective sequences of audio frames;

the estimating the frame-specific key parameters includes estimating the key parameters on a frame-by-frame basis; and the configuring the neural network includes configuring the neural network with the decoded frame-specific key parameters estimated on a frame-by-frame basis to cause the neural network to perform the signal transformation on the frame-by-frame basis, to produce the output audio as a sequence of audio frames.

5. An apparatus comprising:

a decoder to decode encoded input audio and encoded frame-specific key parameters in a received combined bit-stream from a transmission channel to produce decoded input audio and decoded frame-specific key parameters, respectively, wherein the received combined bit-stream includes the encoded frame-specific key parameters in alignment with the encoded input audio at a frame level, wherein the decoded frame-specific key parameters include quantized representations of a target audio characteristic derived from a joint analysis of corresponding frames from target audio and the decoded input audio, wherein the decoded frame-specific key parameters vary from frame to frame and the quantized representations are based on an analysis including a temporal analysis and at least one of a spectral analysis or a frequency harmonic analysis; and a neural network trained to be configured by the decoded frame-specific key parameters as produced by the decoder to perform a signal transformation of audio representative of the decoded input audio and to produce output audio having an output audio characteristic corresponding to and that matches the target audio characteristic, wherein the output audio has perceptually-improved signal quality with frequency bandwidth extension as compared to the decoded input audio.

6. The apparatus of claim 5, wherein:

the audio representative of the decoded input audio includes a sequence of audio frames;

the decoded frame-specific key parameters include a sequence of frame-by-frame key parameters that represent the target audio characteristic on a frame-by-frame basis; and the neural network is configured by the sequence of frame-by-frame key parameters to perform the signal transformation of the audio representative of the decoded input audio on a frame-by frame basis, to produce the output audio as a sequence of output audio frames.

7. The apparatus of claim 5, further comprising a pre-processor to pre-process the input audio to produce pre-processed input audio as the audio representative of the input audio.

8. The apparatus of claim 5, wherein the audio representative of the input audio includes the input audio.

9. The apparatus of claim 5, wherein the decoder is further configured to demultiplex the encoded input audio and the encoded frame-specific key parameters from a multiplexed signal, and then decode of the encoded input audio and the encoded key parameters.

10. The apparatus of claim 5, further comprising:

a blending unit providing a blending operation to blend the decoded input audio with the output audio produced by the neural network.

11. A method comprising:

receiving input audio and frame-specific key parameters that are representative of a target audio characteristic in a multiplexed and combined bit-stream in which both the input audio and the frame-specific key parameters are encoded, wherein the received combined bit-stream includes the encoded frame-specific key parameters in alignment with the encoded input audio at a frame level, wherein the frame-specific key parameters include quantized representations of the target audio characteristic derived from a joint analysis of corresponding frames from target audio and the input audio, wherein the frame-specific key parameters vary from frame to frame and the quantized representations are based on an analysis including a temporal analysis and at least one of a spectral analysis or a frequency harmonic analysis;

demultiplexing and decoding the encoded input audio and the encoded frame-specific key parameters to recover the input audio and the frame-specific key parameters;

configuring a neural network, that was previously trained to be configured by the frame-specific key parameters, with the frame-specific key parameters as decoded to cause the neural network to perform a signal transformation of audio that is representative of the input audio; and producing output audio with an output audio characteristic that matches the target audio characteristic, wherein the output audio has perceptually-improved signal quality with frequency bandwidth extension as compared to the input audio.

12. The method of claim 11, wherein:

the input audio and the audio include respective sequences of audio frames;

the frame-specific key parameters represent the target audio characteristic on a frame-by-frame basis;

and the neural network is configured by the key parameters to perform the signal transformation on a frame-by-frame basis, to produce the output audio as a sequence of output audio frames.

13. The method of claim 11, further comprising pre-processing the input audio to produce pre-processed input audio as the audio.

* * * * *